United States Patent
Alvarez et al.

(10) Patent No.: US 7,088,738 B1
(45) Date of Patent: Aug. 8, 2006

(54) DYNAMIC FRAGMENTATION OF INFORMATION

(75) Inventors: Tara Lynn Alvarez, Lafayette, NJ (US); Donald Edward Crowe, Morris Plains, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 1006 days.

(21) Appl. No.: 09/699,770

(22) Filed: Oct. 30, 2000

(51) Int. Cl.
*H04J 3/16* (2006.01)
*H04L 12/28* (2006.01)

(52) U.S. Cl. ...................................... 370/470; 370/401
(58) Field of Classification Search ............. 370/230.1, 370/322, 352, 401, 471, 474, 493
See application file for complete search history.

(56) References Cited

U.S. PATENT DOCUMENTS

| | | | |
|---|---|---|---|
| 5,341,374 A | * | 8/1994 | Lewen et al. ............... 370/85.4 |
| 5,497,371 A | * | 3/1996 | Ellis et al. .................. 370/412 |
| 5,541,919 A | * | 7/1996 | Yong et al. .................. 370/416 |
| 5,634,006 A | | 5/1997 | Baugher et al. |
| 5,892,753 A | | 4/1999 | Badt et al. .................. 370/233 |
| 6,424,646 B1 | * | 7/2002 | Gerszberg et al. .......... 370/352 |
| 6,570,849 B1 | * | 5/2003 | Skemer et al. ........... 370/230.1 |
| 6,633,540 B1 | * | 10/2003 | Raisanen et al. ........ 370/230.1 |
| 6,650,652 B1 | * | 11/2003 | Valencia ..................... 370/433 |
| 6,956,867 B1 | * | 10/2005 | Suga .......................... 370/465 |

\* cited by examiner

*Primary Examiner*—Steven Nguyen
*Assistant Examiner*—Clemence Han

(57) ABSTRACT

A method and apparatus for transmitting delay sensitive information (DSI) and non-delay sensitive information (NDSI) over a communication link where the NDSI is fragmented in an efficient and intelligent manner and the fragmentation is based on parameters of received DSI so as to reduce the likelihood of transmission conflicts between the DSI and the NDSI. DSI and NDSI are thus interleaved over the communication link in an efficient manner. Both the NDSI and the DSI are transmitted in accordance with a network layer protocol.

8 Claims, 2 Drawing Sheets

DYNAMIC FRAGMENTATION OF INFORMATION

RELATED APPLICATION

Related subject matter is disclosed in the following application concurrently filed herewith: "Dynamic Latency Assignment Methodology for Bandwidth Optimization of Packet Flows", Ser. No. 09/699,773.

BACKGROUND OF THE INVENTION

1. Field of the Invention

The present invention generally relates to the dynamic fragmentation of information packets conveyed throughout a communication network

2. Description of the Related Art

Due to an increase in information traffic in communication networks, many communication networks are evolving to packet-based networks in which packets are conveyed throughout the network based on various protocols. A protocol is a set of rules that dictates how communication is initiated, maintained and terminated between subscribers of the communication network. A packet is typically a block of information (e.g., block of bits) comprising header, payload and trailer portions. The header and trailer portions comprise signaling information, i.e., information that assists the network in forming, transmitting, receiving and rearranging of the packets. The payload is the actual information (i.e., subscriber information) being conveyed over the communication network from a point of origin to a destination point. A communication packet is routed based on signaling information contained in its header and trailer portions and the varying conditions in the network; there is not necessarily one dedicated route or channel for any packet or group of packets.

Older networks such as telephony networks are circuit based networks in which each particular communication channel is established and dedicated for communication between two or more points in a network. Circuit based networks, such as the Public Switched Telephone Network (PSTN), were traditionally used for voice communications, but such networks are now being converted to a packet based architecture. The packet based architecture allows different types of signals to traverse the links of a communication network. Due to the bursty nature of information packets, a packet-based architecture allows for more multiplexing which equates to higher efficiency of network resources.

One type of information that is exchanged between subscribers of a communication network is delay-sensitive information (DSI). Delay sensitive information is information in which there exists a strict timing relationship between consecutive packets and that any alteration in the timing of the packets causes distortion to occur when such packets are received at their destination. DSI also requires that the end-to-end delay is kept constant or is kept within certain defined bounds. End-to-end delay is the amount of time it takes a packet to traverse a network from its source to its destination point. An example of DSI are packets representing voice signals. At the various nodes of a packet-based network, the voice packets should be received at a particular time such that they can be buffered to remove any added time gaps between any two consecutive packets of information. Any added time gap in the reception of DSI, such as voice packets, can cause distortion to occur. The goal is for packets to be received at their destination points with their strict timing relationship maintained. In the case of voice packets, any additional time gaps may cause the resulting voice to become unintelligible to a listener. Another example of DSI is a stream of packets representing a video signal whereby any added time gaps in the reception of the stream of packets may cause the video signal to become distorted to a viewer.

Service providers, which are entities that own and control the communication equipment of the network, need to ensure the quality of service (QoS) for DSI. The QoS of a network depends on several network variables that affect, inter alia, the flow of packets in the network. To ensure an acceptable QoS, some of the network variables such as end-to-end delay, jitter and packet loss must be kept as low as possible. Jitter is the inconsistent latencies experienced by different packets propagating in a network. Packet loss is the number of packets that is irretrievably contaminated—for a defined period of time—due to errors in the header or payload, or due to buffer overflow or due to late arriving packets.

The bandwidths of the communication links of a packet based network are usually sufficient to allow such links to convey both DSI and non-delay sensitive information (NDSI) while maintaining an acceptable QoS for both types of information. The bandwidth of a link is related to the information rate of the link, i.e., the amount of information per unit time (usually measured in bits per second or bps) that can be exchanged through such link at any instant. When DSI has to be transmitted, it cannot be interrupted by other information. Any other information is simply transmitted over additional communication channels within the link or the transmission of other information is temporarily interrupted to allow for the transmission of the DSI. Internet Protocol (IP) networks, i.e., packet based networks based on the well known Internet Protocol have transmission media and network elements which operate at relatively high information rates. The network element typically found in an IP network is a router. A router is an interface between networks of an overall network such as the Internet. Routers are capable of exchanging relatively large amounts of information per unit time. Therefore, a common approach to satisfying the need for acceptable QoS for both DSI and NDSI is to over design a network making sure that the bandwidth of its links and routers is more than enough to handle both DSI and NDSI. In essence, the network will be operating at a utilization rate that is significantly lower for which it was designed.

A packet based communication network or any other communication network must ultimately be connected to its subscribers. The subscribers are connected to the communication network via access networks. The access networks are various types of communication equipment that interface subscribers to the communication network. The access network is connected to the packet based communication network through a network communication link. The access network is also connected to one or more subscribers via at least a second communication link, i.e, an access link. The bandwidth of the access links is typically much smaller than that of the network communication links. However, the service providers must still provide the same type of QoS for the access links as for the links in the core of the packet based network. It is not economically feasible to simply increase the bandwidth of the access links because of the costs associated with replacing equipment and transmission media.

Another approach at ensuring acceptable QoS for DSI and NDSI is to apply priority queuing algorithms to the packets of information. Priority queuing is an algorithm whereby each packet arriving at the access network and destined for a subscriber connected to the access network is placed in a queue based on the type of information contained in the packet and the amount of information that is associated with the packet. The problem with queuing is that queuing by itself is insufficient. Additional techniques are usually needed to better manage the flow of packets into a queue or buffer.

Yet another approach at ensuring acceptable QoS for DSI and NDSI for access links is to apply a fragmentation algorithm to the NDSI packets arriving at the access network. Fragmentation is the repackaging of the packets such that the length of each packet is changed. The packets are transmitted over the communication links of a packet based network in accordance with the well known Internet Protocol (IP) which is network layer protocol. A network layer protocol is the layer 3 protocol of a hierarchy of protocols that are based on the Open System Interconnection (OSI) communications environment model developed by the International Standards Organization (ISO). The layer 3 protocol dictates which physical pathways (i.e., the routing) the packets should take based on network conditions (e.g., network congestion) and other factors such as network variables.

Traditionally, fragmentation is implemented with the use of a layer 2 protocol. The layer 2 protocol, which is also based on the OSI model, dictates how basic units of information (e.g., bits) are arranged to form basic blocks of information (e.g., packets), confirms that such blocks of information are properly placed in the proper communication channels and also confirms that these blocks of information arrive at their destination points without any errors. IP is said to be transported over a layer 2 protocol when any reformatting or repackaging of the blocks of information is done in accordance with the layer 2 protocol. Typically, the fragmentation algorithm repackages the NDSI packets into smaller packets to avoid conflicts with arriving DSI packets. NDSI packets can be interrupted during their transmission to accommodate for arriving DSI packets that have to be transmitted in accordance with strict timing requirements. An NDSI packet is simply retransmitted after its transmission was interrupted by an arriving DSI packet that had to be transmitted within a certain time period. The interruption and subsequent retransmission of NDSI caused by arriving DSI packets reduces the throughput of a communication link because less information is successfully conveyed over that link for a defined period of time. Thus, in a fragmentation algorithm an NDSI packet is fragmented into smaller sized packets based on any one of various layer 2 protocols. The smaller size packets presumably can be transmitted with a relatively high likelihood that their transmission will not be interrupted by the need to transmit an arriving DSI packet.

One problem with the fragmentation algorithm is that many times the fragmentation is done in discord with varying network conditions. For example, NDSI packets can be fragmented to a certain size which may reduce the likelihood of conflicts with DSI packets. However, that particular fragmentation size may not be appropriate at some later time because the network conditions (e.g., an increase in the number of DSI packets) have changed requiring that the NDSI packets be fragmented to a different size. Another problem with fragmentation of IP packets transported over a layer 2 protocol is that, depending on the layer 2 protocol, much overhead is needed to implement the actual fragmentation. Additional information must be placed in the header and/or trailer of the packets such that the packets can be rearranged in their proper order when they arrive at their destination. The additional information added to the packets reduces the amount of information that can be stored in the packet payloads and thus reduces the throughput of the communication network. Also, because fragmenting of NDSI packets is done in accordance with layer 2 protocols, the level of fragmentation is limited to the processing of basic blocks of information defined by such protocols. Thus with layer 2 fragmentation, more finely tuned fragmentation cannot be achieved; this is another source of throughput reduction. For access links, the resulting throughput reduction is particularly damaging due to the already limited bandwidth of these links.

What is therefore needed is a method and apparatus for transmitting in an efficient manner DSI and NDSI over communication links of limited bandwidth (e.g., access links)

SUMMARY OF THE INVENTION

The present invention provides a method and apparatus for transmitting information in an efficient manner over a communication link. Particularly, the present invention provides a method and apparatus for transmitting, in an efficient manner, both DSI and NDSI over communication links of limited bandwidth.

In particular the present invention provides a method where received information is identified as either DSI or NDSI. NDSI is transmitted in a non-fragmented manner while monitoring for the reception of any DSI. Upon reception of DSI, fragmentation operations are performed on NDSI using a network layer protocol (e.g., IP layer of the OSI model or other layer 3 protocol) where such fragmentation is based on various parameters of the received DSI. In this manner, the method and apparatus of the present invention dynamically fragments NDSI allowing both DSI and NDSI to be transmitted over a communication link particularly a communication link of limited bandwidth.

DETAILED DESCRIPTION

The present invention provides a method that first receives and identifies arriving DSI and NDSI. Initially NDSI is transmitted in a non-fragmented manner while monitoring for the reception of any DSI. Upon reception of DSI, a fragmentation operation is performed on NDSI using a network layer protocol (e.g., layer 3 of the OSI model) where such fragmentation is based on various parameters of the received DSI. In this manner, the apparatus and method of the present invention dynamically fragments NDSI allowing for the efficient transmission of both DSI and NDSI over a communication link, particularly over a communication link of limited bandwidth.

The DSI and NDSI are transmitted over a communication link in accordance with a network layer protocol such as the IP or layer 3 OSI-based protocol. Further, the NDSI are fragmented by the use of fragmentation operations defined by the layer 3 protocol. In sum the apparatus and method of the present invention interleave the transmission of DSI and NDSI so as to use the communication link in an efficient manner.

Figure 1:
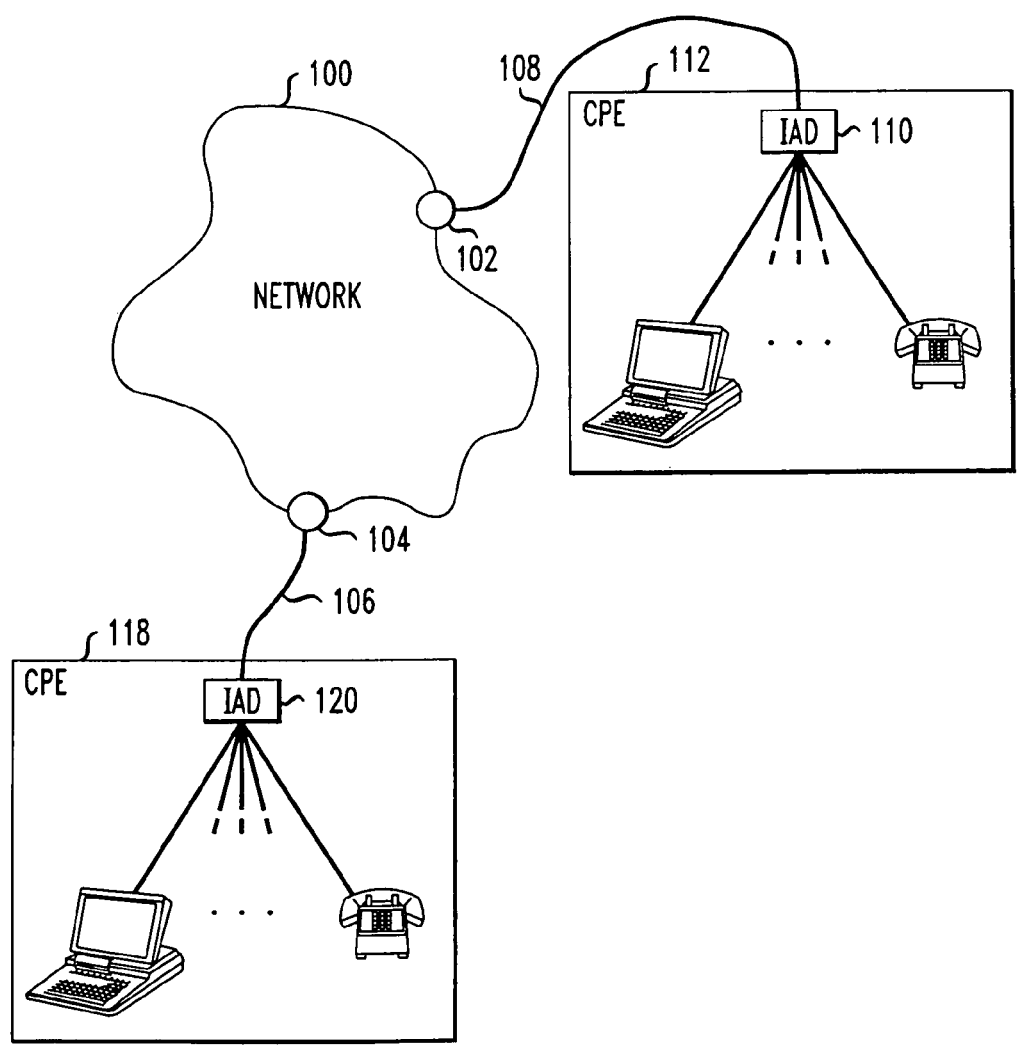
FIG. 1 depicts a packet based communication network coupled to two access networks.

Referring to FIG. 1, there is shown packet based communication network 100 having various access hosts (102, 104) at its edge. Hosts 102 and 104 are communication equipment that receive, transmit and process information that are destined for subscribers or destined for some node in the network. Hosts 102 and 104 are equipment that serve as interfaces between the access network and the core network. Examples of equipment represented by hosts 102 and 104 include Digital Subscriber Line Access Multiplexer (DSLAM) and Access Concentrators. Customer Premises Equipment (CPE) 118 and 112 are coupled to hosts 102 and 104 respectively via access links 106 and 108.

Typically, part of a CPE is an Integrated Access Device (IAD) that combines information from various subscriber equipment and transmits such information over an access link in accordance with a protocol being followed by the access network. Conversely, an IAD is also able to receive information from the access network and route such information to the proper subscriber equipment in accordance with the protocol of the access network. The CPE further comprises subscriber equipment such as telephones, facsimile machines and personal computers. It will be readily understood that hosts 102 and 104, CPE 112 and 118 and access links 106 and 108 are shown for illustrative purposes only and that a network such as network 100 is usually connected to more than two access networks.

Figure 2:
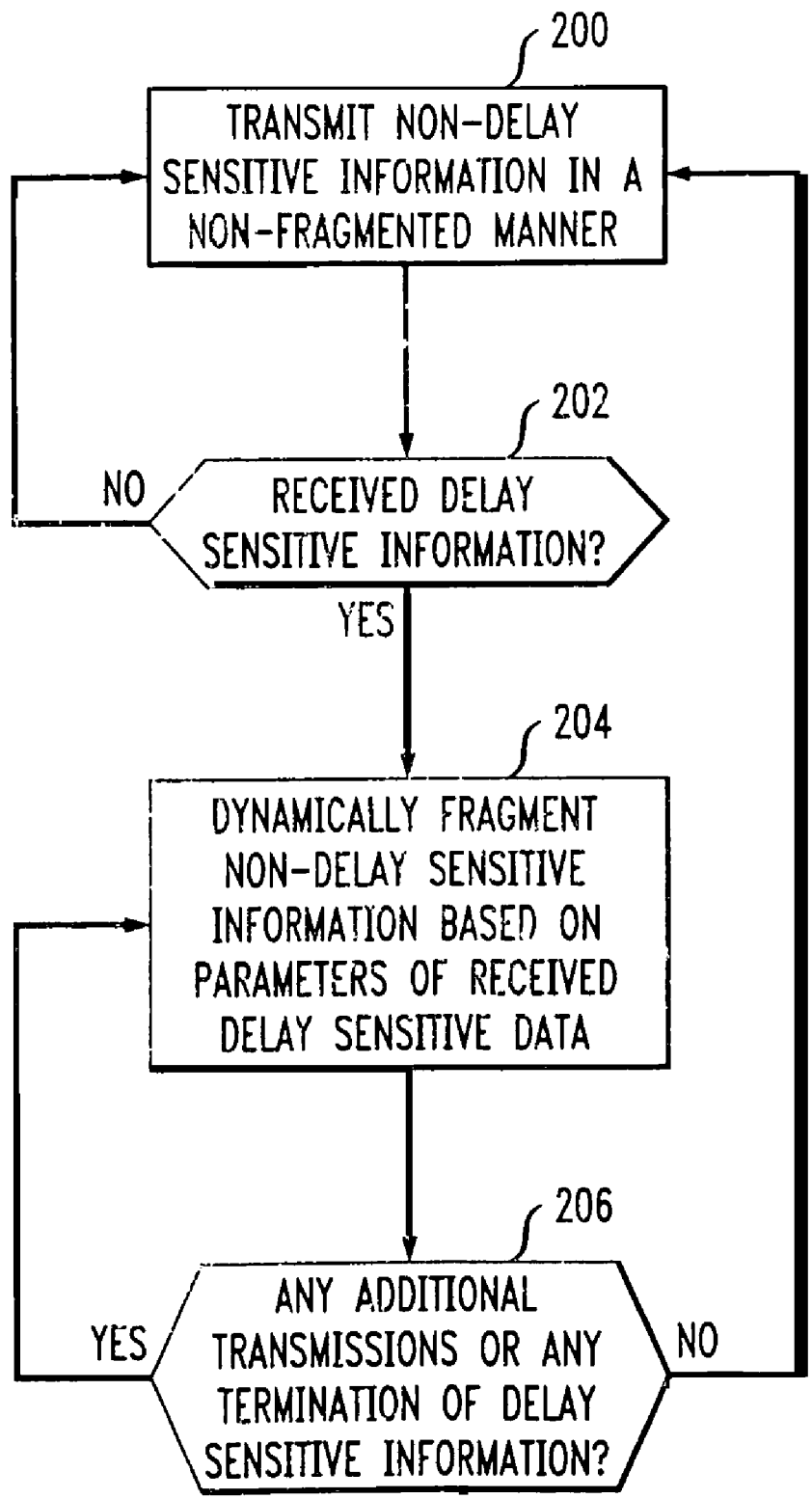
FIG. 2 depicts the method of the present invention.

Referring now to FIG. 2, there is shown the method of the present invention, which can be implemented at an IAD and/or at a host as shown in FIG. 1. It should be noted, however, that the method of the present invention can also be implemented at any node of a packet based network. A node is any particular point in the network comprising communication equipment that transmit, process and receive information being conveyed over the network. For ease of explanation, the method of the present invention is discussed from the point of view of IAD 120 transmitting DSI and NDSI (received from subscriber equipment) to host 104 via access link 106.

Suppose that initially IAD 120 is transmitting NDSI to host 104. In step 200 of the method of the present invention, IAD 120 transmits the NDSI over access link 106 in a non-fragmented manner. In other words, the NDSI is transmitted continuously or in relatively long packets for as long as possible. The non-fragmented transmission of NDSI represents an efficient use of access link 106 because the continuous transmission of information allows very little or no time gaps in the transmission. The non-fragmented transmission of information is implemented with the use of buffers that temporarily store arriving NDSI and rearrange such information so that it is transmitted with relatively little or no time gaps.

In step 202, while transmitting only NDSI, IAD 120 is monitoring the changing state (e.g., ON HOOK/OFF HOOK) of subscriber equipment such as phones, facsimile machines as well as monitoring data packets from other CPE's such as PCs to determine if any DSI flows are being initiated or terminated. IAD 120 can apply any one of various techniques to monitor packets. For example, IAD 120 can monitor in a periodic manner, in a continuous manner or in an aperiodic manner. IAD 120 determines whether a packet is DSI based on header information formatted in accordance with a higher layer protocol (e.g., layer 4 protocol of the OSI-model). IAD 120 can also determine whether a packet is an initial DSI packet or a last DSI packet from a subscriber equipment based on the changing state of subscriber equipment. For example, after a phone changes state from OFF HOOK to ON HOOK, IAD 120 is aware that no more packets are to be transmitted for that phone. Conversely, a phone changing state from ON HOOK to OFF HOOK is an indication that the next packet is an initial packet from that subscriber equipment. An initial packet is thus the first packet carrying subscriber information that is generated. NDSI packets have information in their headers that inform IAD 120 (or any other communication node) the length of the information being transmitted. Information about the timing relationship between any two consecutive packets is derived by IAD 120 based on the characteristic of the signal that such packets represent. In particular, IAD 120 generates the packets for various subscriber equipment connected thereto. For example, voice signals are typically sampled at a rate of 8 KHz (8000 samples per second) meaning that a sample is generated every 125 μsec. Each sample, or a group of samples, is converted to a DSI packet and queued for transmission by IAD 120. Each such DSI packet should be transmitted by IAD 120 at the appropriate multiple of 125 μsec to maintain the necessary periodicity between packets. The samples or groups of samples are said to have a periodicity of 125 μsec. The periodicity is therefore the basic timing relationship between consecutive packets or group of packets. Other DSI signals (e.g., video) from various subscriber equipment are also sampled and such signals are transmitted to IAD 120 in accordance with strict timing relationships between consecutive packets. It should be noted that the IAD generates packets for subscriber equipment such as traditional telephones and facsimile machines. Other subscriber equipment such as computers generate the packets themselves, but in such cases, the IAD still contains the intelligence to dynamically fragment the NDSI as per the method of the present invention.

Upon reception of a DSI packet from subscriber equipment, or generation of the DSI packet as described, the method of the present invention moves to step 204. In step 204, IAD 120 determines when to transmit the arriving DSI packet based on the periodicity of the DSI packet and other parameters of the DSI packet that are typically stored in the header and/or trailer of the packet. If IAD 120 is transmitting NDSI during the arrival of the DSI packet, IAD 120 first determines whether the NDSI needs to be fragmented or whether to finish with the transmission of the NDSI before transmitting the just arrived DSI. In some cases, the arrival of the DSI may have occurred near the end of the transmission of the NDSI and therefore finishing the NDSI transmission will not affect in any manner the time of transmission of the arriving DSI packets. In other cases, however, the NDSI transmission has to be interrupted in order to adhere to the strict timing requirements of the arriving DSI. Regardless of whether the NDSI is interrupted, upon reception of the DSI packet IAD 120 calculates the fragmentation requirement (of subsequent NDSI packets) based on the parameters of the arriving DSI packet. The fragmentation is done at the network layer protocol. In other words, at the network layer, the size of the NDSI packet is altered so as to reduce the likelihood of conflicts between transmission of DSI and NDSI. The particular parameters are variables such as sample rate, information compression, amount of overhead information, number of channels included in the DSI, and amount of information per channel included in the DSI.

For ease of explanation only, suppose the arriving DSI packet is part of Z different voice signals (i.e., Z communication channels) where each voice signal was sampled at a rate of K times/sec (or K samples/sec) and each sample comprises J bits. Each block of J bits of a sample undergoes a bit compression of L; that is each sample is compressed to $$\frac{J}{L}$$

bits. Suppose also that for each of the Z streams, N bytes of information (i.e., subscriber information) are assembled resulting in a block of information comprising ZN bytes (1 byte=8 bits). Suppose further that Mbytes of overhead information are added to form a block of information containing ZN+M bytes. In other words each DSI packet contains ZN+M bytes of information. Thus, it takes $$\frac{8NZ}{JLK}$$

seconds to transmit a voice packet comprising ZN+M bytes of information where $$\frac{8NZ}{JLK}$$

represents a cycle or periodicity of transmission. The terms 'periodicity' and 'cycle' are hereinafter used interchangeably. Link 106 has an information rate of X bps or $$\frac{X}{8}$$

bytes/second. In sum, link 106 is able to transmit $$\frac{X}{8} * \frac{8NZ}{JLK}$$

bytes per cycle. Therefore, the length of NDSI packets for any one cycle is limited to $$\frac{XNZ}{JLK} - (ZN + M)$$

or the capacity of the link minus the length of DSI packet for one cycle. The variable J, K, L, M, N, X and Z are all integers equal to 1 or greater.

Suppose link 106 operates at a Digital Signal 1 (DS1) rate (i.e., information rate) meaning that X=1.544 Mbps. Also, the parameters of the arriving DS1 packet has the following values: J=8; L=1; N=40; Z=1; K=8 KHz; and M=20 bytes. The cycle of transmission or the period of time during which a packet is transmitted is $$\frac{8NZ}{JLK}$$

or 5 msec/cycle. Link 106 has a capacity of $$\frac{1.544 \times 10^6 \frac{\text{bits}}{\text{sec}}}{\frac{1 \text{ byte}}{8 \text{ bits}}} = 193 \times 10^3 \frac{\text{bytes}}{\text{sec}} = 5.18 \frac{\mu\text{sec}}{\text{byte}}.$$

Link 106 is thus able to transmit $$\frac{X}{8} * \frac{8NZ}{JLK} = 965 \text{ bytes/cycle.}$$

Therefore, the total number of bytes/cycle that can be used for NDSI packets is 965 bytes/cycle−20 bytes of overhead/cycle−40 bytes of delay sensitive information/cycle=905 bytes/cycle. NDSI packets that are 905 bytes long or less per cycle will most likely not be interrupted by DSI packets having the parameters outlined above. The packets are packaged at the network layer protocol as per the OSI-based layer 3 protocol or any other layer 3 protocol.

In step 206 of the method of the present invention, the fragmentation requirements of different DSI packets are calculated and the fragmentation is changed when a more restrictive requirement is calculated. A fragmentation calculation is performed for every initial DSI packet received. Each newly calculated fragmentation requirement is stored by IAD 120 in a list. Each arriving initial DSI packet will cause more fragmentation to occur. The list is updated as new DSI are received. It is thus important for the method of the present invention to perform a fragmentation calculation for every arriving initial DSI packet and only alter the fragmentation of the NDSI packets when an initial packet has parameters that require a more restrictive NDSI packet length than the current calculated NDSI packet length. Thus, IAD 120 continues to monitor for new arrivals of DSI packets and reviews the fragmentation requirements stored in the list to ensure that it is complying with the most restrictive fragmentation requirement; that is, the fragmentation requirement mandating the shortest fragmentation length has to be satisfied. Also, as a subscriber goes ON HOOK (i.e., termination of communication), its fragmentation requirement is no longer needed. Returning to our example, suppose the next arriving initial DSI packet has parameters that require a fragmentation length of 800 bytes/cycle. IAD 120 will then alter its fragmentation and proceed to fragment the NDSI packets at 800 bytes/cycle.

When the transmission of a particular stream of DSI packets is terminated, IAD 120 will accordingly update its list of fragmentation requirements and change, if necessary, the fragmentation of the NDSI packets. Continuing with our example, transmission of DSI packets requiring fragmentation of 800 bytes/cycle are terminated. IAD 120 will then start to fragment packets based on the next most restrictive requirement from its list; that is, the NDSI packets will now be fragmented at a length of 905 bytes/cycle. IAD 120 will thus continue until there are no more DSI packets to be transmitted at which point the method of the present invention returns to step 200 where no fragmentation is performed until a DSI packet arrives.

As previously stated the method of the present invention can also be implemented at a host. Suppose, for example, host 104 is transmitting NDSI and DSI information to CPE 118 over communication link 106. Host 104 would apply the method of the present invention in the same manner as implemented by IAD 120. Host 104 would calculate a new fragmentation requirement for each initial DSI it receives from packet based network 100. The fragmentation calculation is based on parameters of the arriving DSI packet and is packaged at a network layer. The parameters are stored in the header and/or trailer of the arriving DSI packet. Host 104 can determine whether an arriving DSI packet is an initial packet or a last packet from information provided by IAD 120. In other words, an arriving packet determined to be a DSI packet by Host 104 is transmitted to IAD 120 over communication link 106. IAD 120 determines that such an arriving packet is an initial packet from the changing state of the destination subscriber equipment and also determines the periodicity of associated packets from the characteristics of the destination subscriber equipment. IAD 120 transmits the periodicity information to Host 104 advising Host 104 that the packet was an initial DSI packet having a periodicity of a particular value. Host 104 subsequently transmits associated packets in accordance with the periodicity. Host 104 also receives information from IAD 120 when a subscriber equipment terminates communications. The resulting last packet is identified by IAD 120 which transmits a message over link 106 to Host 104 identifying the packet as a last packet; this allows Host 104 to update its fragmentation requirement list to make sure that the most restrictive fragmentation requirement is being met.

The apparatus of the present invention can be implemented with digital and/or analog circuitry, digital processors and microprocessor based circuitry that operate in accordance with programmed instruction such as high level software and/or firmware. The apparatus of the present invention can be part of any node of a communication network (including host equipment) or can be part of an IAD. Further, the method of the present invention is implemented as software and/or firmware that operate various communication equipment of a communication network.

We claim:

1. A method for transmitting delay sensitive information (DSI) and non-delay sensitive information (NDSI) over a communication link of a communication network, the method comprising the steps of:
    transmitting fragmented NDSI in accordance with a network protocol where the fragmenting is based on parameters of received DSI and is performed in accordance with a network layer protocol;
    calculating a fragmentation requirement for each received initial DSI;
    reviewing the fragmentation requirements of the received DSI after a new DSI requirement was calculated or after transmission of a DSI was terminated to determine a fragmentation requirement that is most restrictive; and
    altering the fragmenting of NDSI to comply with the most restrictive fragmentation requirement.

2. The method of claim 1 comprising transmitting DSI in accordance with required timing relationships and transmitting NDSI in a non-fragmented manner when there are no DSI to be transmitted.

3. The method of claim 1 where the network protocol is an OSI-based layer 3 protocol.

4. The method of claim 1 where the fragmenting is based on information rate of the communication link.

5. The method of claim 1 where the parameters of the received DSI comprise variables including information compression, sample rate of DSI, number of communication channels included in the DSI, amount of overhead information included in the DSI and amount of subscriber information in the DSI.

6. An apparatus for transmitting delay sensitive information (DSI) and non-delay sensitive information (NDSI) over a communication link of a communication network where the apparatus
    fragments the NDSI in accordance with a network layer protocol and based on parameters of received DSI;
    calculates a fragmentation requirement for each received initial DSI;
    reviews the fragmentation requirements of the received DSI after a new DSI requirement was calculated or after transmission of a DSI was terminated to determine a fragmentation requirement that is restrictive; and
    alters how the apparatus fragments NDSI to comply with the most restrictive fragmentation requirement.

7. The apparatus of claim 6 configured as an integrated access device (IAD) coupled to subscriber equipment and to an access network.

8. The apparatus of claim 6 configured as host equipment that is coupled to a packet based communication network and to an access network.

* * * * *